United States Patent [19]
Lederman et al.

[11] Patent Number: 5,627,704
[45] Date of Patent: May 6, 1997

[54] THIN FILM GIANT MAGNETORESISTIVE CPP TRANSDUCER WITH FLUX GUIDE YOKE STRUCTURE

[75] Inventors: Marcos M. Lederman, San Francisco; Derek J. Kroes, Fremont, both of Calif.

[73] Assignee: Read-Rite Corporation, Milpitas, Calif.

[21] Appl. No.: 600,239

[22] Filed: Feb. 12, 1996

[51] Int. Cl.$^6$ .................... G11B 5/39; G11B 5/31
[52] U.S. Cl. .......................... 360/113; 360/126
[58] Field of Search .................... 360/113, 125, 360/126; 338/32 R; 324/252; 428/611, 928

[56] References Cited

U.S. PATENT DOCUMENTS

| | | | |
|---|---|---|---|
| 4,949,039 | 8/1990 | Grunberg | 360/113 |
| 5,251,088 | 10/1993 | Coutellier et al. | 360/113 |
| 5,270,895 | 12/1993 | Ruigrok et al. | 360/113 |
| 5,390,061 | 2/1995 | Nakatani et al. | 360/113 |
| 5,446,613 | 8/1995 | Rottmayer | 360/113 |
| 5,483,402 | 1/1996 | Batra | 360/113 |
| 5,493,467 | 2/1996 | Cain et al. | 360/113 |
| 5,527,626 | 6/1996 | Gijs et al. | 360/113 |

OTHER PUBLICATIONS

Journal of Magnetism and Magnetic Materials, #151; Gijs et al; "Perpendicular Giant Magneto . . . " 1995.
Physical Review Letters; Baibich et al; "Giant Magnetoresistance of (001)Fe/(001)Cr Magnetic . . . " Nov. 1988.
IEEE Transactions on Magnetics; Folkerts et al; "Performance of Yoke Type GMR Heads" Nov. 1995.

*Primary Examiner*—Jefferson Evans
*Attorney, Agent, or Firm*—Nathan N. Kallman

[57] ABSTRACT

A giant magnetoresistive (GMR) thin film transducer employs a pair of flux guide pole members that define a magnetic transducing gap. A GMR structure formed of a stack of multiple layers is located between spaced portions of one of the flux guide pole members and away from the transducing gap. Bias current is supplied in a CPP (current perpendicular to the plane) mode. In an alternative embodiment, a plurality of such GMR structures are connected together serially to provide a larger output signal than that obtained with a single GMR stack.

4 Claims, 2 Drawing Sheets

1

THIN FILM GIANT MAGNETORESISTIVE CPP TRANSDUCER WITH FLUX GUIDE YOKE STRUCTURE

CROSS-REFERENCE TO RELATED APPLICATION

Copending application Ser. No. 08/600,238 (A23795) filed Feb. 12, 1996 and assigned to the same assignee as the present application, discloses a thin film transducer that employs giant magnetoresistance (GMR) with a magnetic flux guide yoke structure and operates in a current-in-the-plane (CIP) mode.

BACKGROUND OF THE INVENTION

1. Field of the Invention

This invention relates to a thin film magnetic transducer incorporating magnetic yoke members which act as guides for magnetic flux and a giant magnetoresistive sensor for reading magnetically recorded information.

2. Description of the Prior Art

The use of magnetic transducers employing sensors using giant magnetoresistance (GMR) has been known for some time. U.S. Pat. No. 4,949,039 to Grunberg discloses a thin film transducer employing a stack of spaced ferromagnetic layers separated from each other by layers of nonmagnetic metal such as copper, silver or gold, or antiferromagnetic material such as chromium. Alternate ferromagnetic layers are magnetized in opposite directions. The nonmagnetic/antiferromagnetic materials are composed of materials which cause a spin dependent electron scattering at the layer interfaces. The magnetic resistance change, termed giant magnetoresistance, in response to magnetic flux sensed by the transducer is substantially greater than that observed in structures which do not employ antiparallel magnetization layers and such intermediate nonmagnetic/antiferromagnetic layers.

U.S. Pat. No. 5,270,895 to Ruigrok et al. describes a thin film magnetic transducer employing a yoke type flux guide which is shared between the read portion and the write portion of the transducer to improve the operation of the read and write functions. In the structures shown in that patent, the magnetoresistive (MR) element is positioned external to the flux guide yoke members.

A publication entitled *Giant Magnetoresistance of (001) Fe/(001) Cr Magnetic Superlattices*, Baibich et al. Physical Review Letters, Volume 61, Number 21, page 2472, 1988, discusses the effects on the magnetoresistance of Fe/Cr magnetic lattices with variations in the Cr layer thickness. The giant magnetoresistance is ascribed to spin-dependent scattering of conduction electrons at the interface between Fe and Cr layers.

A publication entitled *Performance Of Yoke Type GMR Heads*, Folkerts et al, IEEE Transactions on Magnetics, November 1995 discloses a spin valve GMR transducer in which the sensing element is positioned above the two separate components of a yoke type flux guide.

SUMMARY OF THE INVENTION

In accordance with an embodiment of this invention, a thin film magnetic transducer comprises first and second pole layers that form a magnetic yoke. The pole layers define a transducing gap that is located at the air bearing surface (ABS) of the air bearing slider (not shown) which supports the transducer. One of the pole layers has a gap or opening in which a GMR structure, which is formed as a stack, is disposed so that the yoke couples magnetic flux to the GMR structure. The GMR structure is spaced from the ABS so that increased space is made available to allow the number of layers in the GMR stack structure and the length and width of the stack to be optimized. Conductor leads are provided to supply sense current to the GMR structure, which is preferably in the form of a multilayer stack having sense current flowing perpendicular-to-the-plane (CPP) of the stack layers. Magnetic bias is provided to the GMR structure from a permanent magnet to reduce BarKnausen noise and optimize the sensitivity (operating point) of the GMR structure. By spacing the GMR structure from the transducing gap, increased space is made available to allow the number of layers in the GMR stack structure and the length and width of the stack to be optimized. With this configuration, the complexity of the manufacturing processes is significantly reduced.

In another embodiment of the invention, a plurality of multilayer GMR stacks are linked electrically in a "daisy-chain" configuration whereby the output signal produced by the GMR structure is increased.

DESCRIPTION OF THE PREFERRED EMBODIMENT

Figure 1:
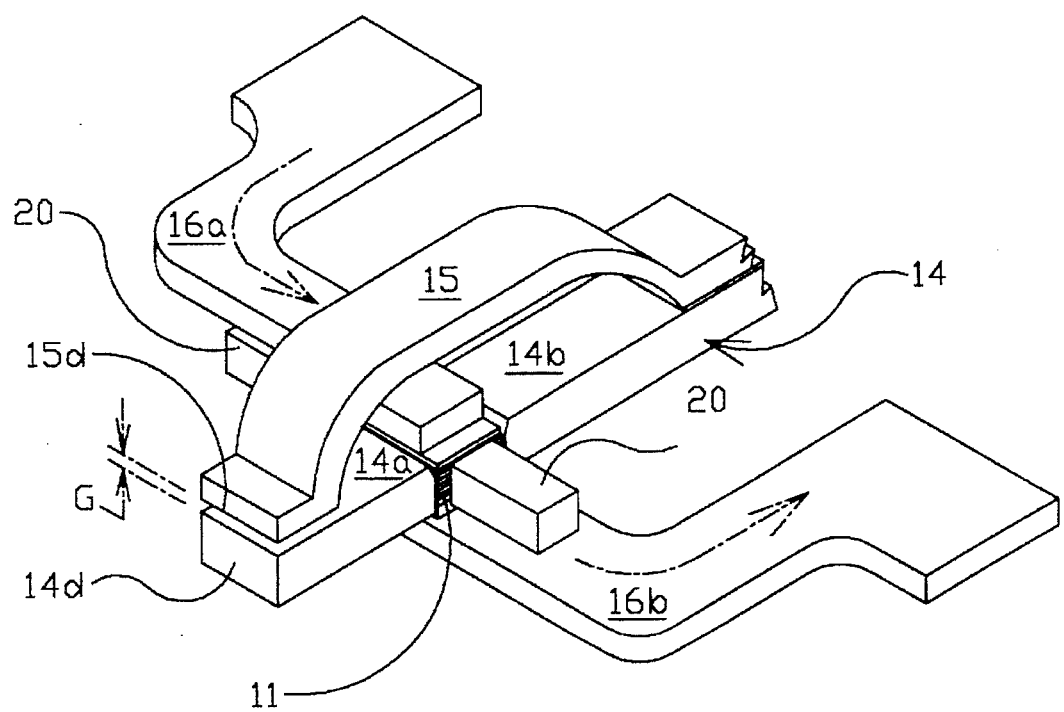
FIG. 1 is an isometric view of one embodiment of the present invention.

With reference to FIG. 1, a thin film magnetic transducer comprises a lower flux guide yoke member 14 and an upper flux guide yoke member 15, each having pole tip regions defining a transducing gap G. A GMR stack structure 11 is positioned between and in magnetic contact with two separate portions 14a, 14b of the lower flux guide member 14. As is known in the art and as shown an FIG. 1A, GMR structure 11 includes a stack of alternating ferromagnetic layers 11b and nonmagnetic/antiferromagnetic metallic layers 11c. GMR structure 11 may also include a lower seed layer or buffer layer 11d of material such as Fe or Ru or other suitable material to maximize the magnetoresistance of the GMR stack.

Figure 1A:
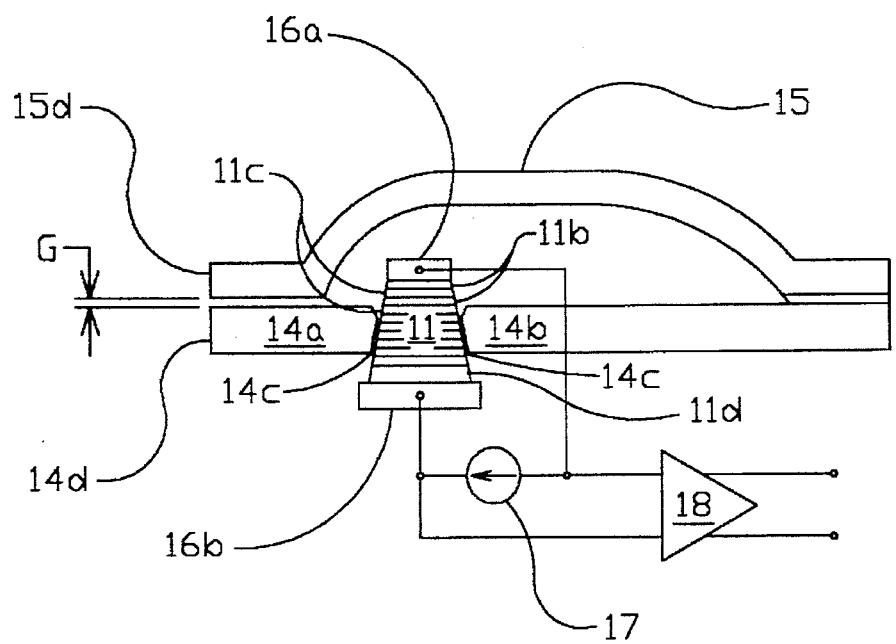
FIG. 1A is a schematic plan representation of the magnetic an electrical elements of the embodiment of FIG. 1.

GMR structure 11 is spaced from and electrically isolated from the facing ends of flux guide pole layer portions 14a, 14b by magnetic gaps 14c. Sense current is supplied to GMR structure 11 through a top conductive lead 16a and a lower conductive lead 16b. Current flows from conductive lead 16a through GMR structure 11 from top to bottom and then through lower lead 16b, resulting in a CPP mode of operation of the device. As shown in FIG. 1A, the sense current may be supplied from a current source 17, and variations in the voltage drop across GMR structure 11 are detected in amplifier 18 and supplied to a suitable utilization means (not shown) as an indication of the magnetic flux sensed by the transducer.

Magnetic bias is provided to GMR structure 11 by permanent magnet means 20 which exerts a magnetic field perpendicular to the induced field to reduce Barkhausen noise and optimize the GMR structure operating point. The upper flux guide yoke member 15 extends over pole portions 14a, 14b and conductive lead 16a to provide magnetic coupling of the induced field with GMR structure 11. The faces 14d, 15d of lower and upper flux guide yoke members 14, 15 respectively are closely spaced by a distance G representing the transducing gap. In operation, gap G is positioned closely adjacent to or in intermittent contact with a recording surface of a magnetic medium (not shown) for transducing information signals.

The GMR structure of FIG. 1 is located in an opening between spaced portions of the lower flux guide yoke member 14 and spaced from the ABS (air bearing surface) of the air bearing slider (not shown) on which the flux guide yoke members 14 and 15 and the GMR structure 11 are disposed with the transducing gap G located at the ABS. In this way, the number of the stack layers of the GMR structure 11, including their length and width, are optimized. As one alternative to the structure of FIG. 1, stack structure 11 may be positioned between spaced portions provided in upper flux guide yoke member 15 rather than between the spaced portions of lower flux guide yoke member 14 as shown in FIG. 1.

Figure 2:
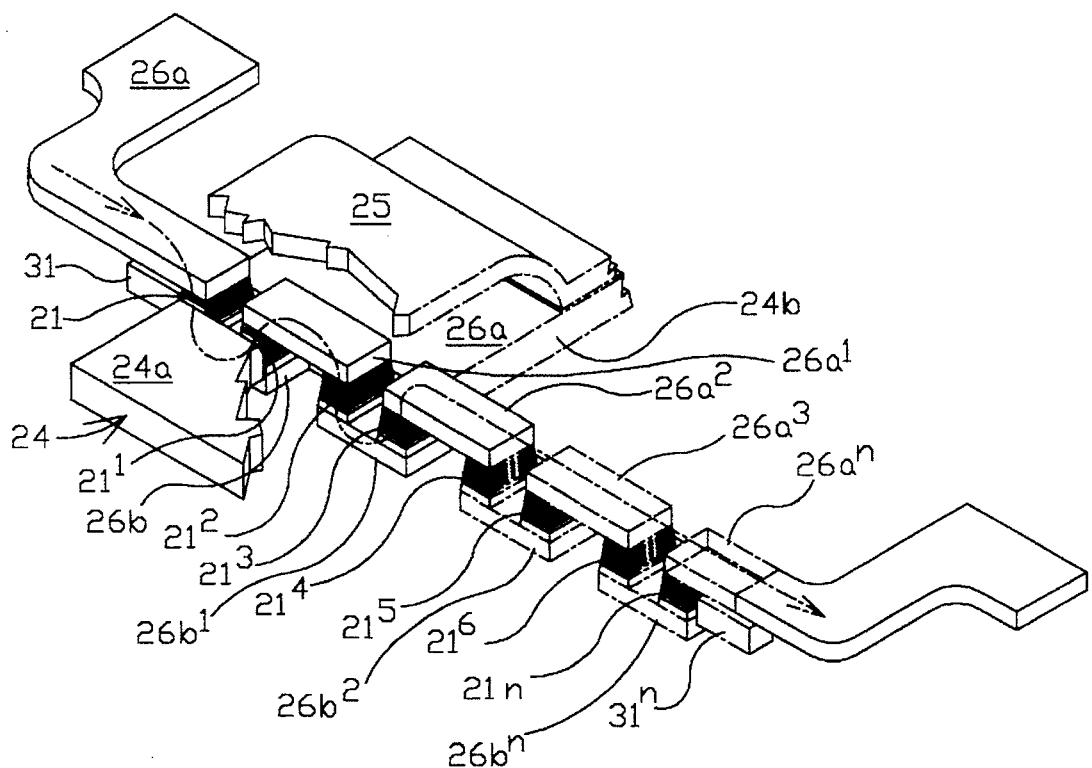
FIG. 2 is an isometric view of an embodiment in which a plurality of GMR elements are electrically linked together, in accordance with this invention.
Figure 2A:
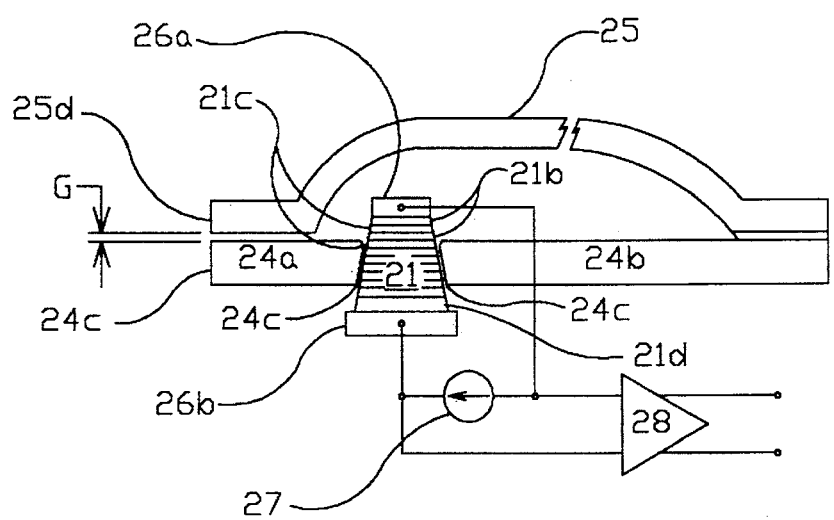
FIG. 2A is a schematic plan representation of the magnetic and electrical elements of the embodiment of FIG. 2.

FIG. 2 illustrates an alternative embodiment of the invention in which a plurality of GMR structures are linked electrically to increase the output signal available from the assembly. Reference numerals 21, $21^1$, $21^2$, $21^3$, $21^4$, $21^5$, $21^6$, $21^n$ identify a plurality of GMR structures similar to GMR structure 11 of FIG. 1. An upper flux guide yoke member 25 may be extended, as indicated by the dashed lines at its side, across the width of the plurality of GMR structures. A lower flux guide member 24 has a front portion 24a magnetically linked to the front surfaces of GMR structures $21-21^n$ and has a rear portion 24b in magnetic proximity to the back surfaces of stacks $21^n$. As shown in FIG. 2A, each of stack members $21-21^n$ has alternating layers 21b of ferromagnetic material and layers 21c of nonmagnetic/antiferromagnetic material. Each of stacks $21-21^n$ is electrically isolated from the facing ends of flux guide yoke member portions 24a, 24b by magnetic gaps 24c, similar to gaps 14c shown in FIG. 1A. A layer of buffer material is positioned under each of the multiple multilayer magnetoresistive structures.

Lower flux guide yoke member 24 operates, as described above in connection with lower flux guide yoke member 14 of FIG. 1, to function with upper flux guide yoke member 25 as a flux guide, with a transducing gap G that is located adjacent to the recording surface of a magnetic medium during operation in a disk drive, for example.

A conductive lead segment 26a is connected to the top of GMR stack 21. The tops of adjacent GMR stacks 21, $21^1$, $21^2$, $21^3$, $21^4$, $21^5$, $21^6$, $21^n$ are electrically connected together by conductive lead segments $26a^1$, $26a^2$, $26a^3$, $26a^n$. Similarly, the bottoms of the GMR stacks 21, $21^1$, $21^2$, $21^3$, $21^4$, $21^5$, $21^6$, $21^n$, are electrically connected together by lower conductive lead segments 26b, $26b^1$, $26b^2$ and $26b^n$. As can be seen, the current flows through the GMR stacks in a direction to produce a CPP mode of operation. Thus, the successive GMR stacks are "daisy-chained" together electrically so that this composite structure is capable of producing a greater output signal than a single GMR stack.

A magnetic bias is provided to the GMR structures by permanent magnets represented by 31, $31^n$ located adjacent to GMR stacks 21 and 21n. For clarity, additional permanent magnets are not shown in FIG. 2, but it should be understood that additional permanent magnets adjacent to each of stacks $21-21^n$ may be employed to produce the required bias.

What is claimed is:

1. A multilayer magnetoresistive thin film transducer for transducing coaction with a magnetic recording medium comprising:

a magnetic yoke including a first flux guide member and a second flux guide member spaced from said first flux guide member, one end of each of said first and said second flux guide members extending to a media-facing end of said transducer to form a transducing gap;

a plurality of spaced multilayer giant magnetoresistive structures, said plurality of spaced multilayer giant magnetoresistive structures being disposed in one of said flux guide members such that said structures lie in the path of magnetic flux induced in said one flux guide member from the magnetic recording medium, said multilayer giant magnetoresistive structures being spaced from said transducing gap;

electrical conductors provided between said spaced magnetoresistive structures so that said plurality of spaced magnetoresistive structures are connected in series electrically with each other for increasing the total electrical resistance of said transducer;

a current source connected to said electrical conductors such that electrical current passed through said conductors flows through said giant magnetoresistive structures in a direction perpendicular to the planes of the individual layers of said multilayer giant magnetoresistive structures; and magnetic biasing means positioned in magnetic proximity to said multilayer giant magnetoresistive structures for providing a magnetic bias to said giant magnetoresistive structures.

2. A transducer as in claim 1, wherein said magnetic biasing means is provided by permanent magnets located at the sides of each of said multiple multilayer magnetoresistive structures.

3. A transducer in accordance with claim 1 including a layer of buffer material positioned under each of said multilayer magnetoresistive structures.

4. A transducer as in claim 3, wherein said magnetic biasing means is provided by permanent magnets located at the sides of each of said multiple multilayer magnetoresistive structures.

* * * * *